United States Patent

Smith et al.

[11] Patent Number: 5,880,451
[45] Date of Patent: Mar. 9, 1999

[54] SYSTEM AND METHOD FOR OCR ASSISTED BAR CODE DECODING

[75] Inventors: Christopher E. Smith, Newton, Conn.; Ming Lei, Norwood, Mass.

[73] Assignee: United Parcel Service of America, Inc., Atlanta, Ga.

[21] Appl. No.: 840,051

[22] Filed: Apr. 24, 1997

[51] Int. Cl.[6] .................................................. G06K 7/10
[52] U.S. Cl. .......................................... 235/462; 235/470
[58] Field of Search .................................. 235/462, 470, 235/463

[56] References Cited

U.S. PATENT DOCUMENTS

| | | | |
|---|---|---|---|
| 3,744,025 | 7/1973 | Bilgutay | 340/146.3 |
| 3,949,363 | 4/1976 | Holm | 235/462.07 |
| 4,402,088 | 8/1983 | McWaters et al. | 382/68 |
| 4,408,344 | 10/1983 | McWaters et al. | 382/62 |
| 4,411,016 | 10/1983 | Wakeland | 382/62 |
| 4,542,528 | 9/1985 | Sanner et al. | 382/62 |
| 4,844,509 | 7/1989 | Kasprzak et al. | 235/462 |
| 4,856,820 | 8/1989 | Kasprzak et al. | 235/462 |
| 5,307,423 | 4/1994 | Gupta et al. | 382/11 |
| 5,380,998 | 1/1995 | Bossen et al. | 235/494 |
| 5,412,194 | 5/1995 | Melbye et al. | 235/437 |

FOREIGN PATENT DOCUMENTS 06103400 4/1994 Japan .
09237312 9/1997 Japan .

*Primary Examiner*—Anita Pellman Gross
*Assistant Examiner*—Drew A. Dunn
*Attorney, Agent, or Firm*—Jones & Askew, LLP

[57] ABSTRACT

A system for using OCR processing to read human readable characters that correspond to an unsuccessfully decoded code word in a bar code symbol. An imaging system captures an image of a label that includes a bar code symbol and corresponding human readable characters. The system attempts to decode the bar code symbol by decoding each of the constituent bar code characters. If a bar code characters is not successfully decoded, the system locates the associated human readable text and segments the text into individual character images. The unsuccessfully decoded bar code character is mapped to one or more of the alphanumeric character images, which are converted into text characters. The resulting ASCII data is used to create a substitute bar code character in the bar code symbology. After the bar code symbol is decoded using the substitute bar code character, the symbol is validated through check summing or other means.

22 Claims, 8 Drawing Sheets

Fig_3

SYSTEM AND METHOD FOR OCR ASSISTED BAR CODE DECODING

TECHNICAL FIELD

The present invention relates to bar code decoding systems, and more particularly relates to systems for using associated human readable text to decode unreadable bar code data.

BACKGROUND OF THE INVENTION

Bar codes are used to provide machine readable identification labels on a wide variety of items. For example, bar codes are used to identify goods and merchandise that are sold in stores or stored in warehouses. Bar codes are also used to provide machine readable tracking numbers on shipping labels in order to identify packages that are handled by package delivery companies.

Once a bar code is read and decoded by a suitable bar code reader, a computer may use the decoded number to access associated data that has been stored in a database. For example, with goods and merchandise, each product has a unique bar code number, and the associated data would identify the product and its price, manufacturer, etc. With a package, the label number would uniquely identify the package, and the associated data would include information such as the size and weight of the package, the origin and destination addresses, and type of service selected (e.g., overnight delivery, second day delivery, etc.).

Bar codes are read by laser scanners or by decoding an image that has been captured by an electronic camera. Most stores rely on laser scanners to scan and decode bar codes. Small package delivery companies such as the assignee of the present invention increasingly utilize electronic cameras to capture two-dimensional images of package surfaces. Once an image is captured, it may be processed to identify and decode a variety of indicia, including bar codes, two-dimensional dense codes, and alphanumeric characters.

Although there are many methods that may be used to decode a bar code, these methods may fail if the bar code itself is degraded or partially obliterated. Depending on the extent of the damage to the bar code, the bar code may be read by rescanning the bar code at a slightly different position or orientation. However, in some cases, the damage or degradation may be extensive enough that no amount of rescanning will be able to recover the lost information.

In most cases, the human readable characters that correspond to the bar code characters are printed adjacent to the bar code. When the bar code is unreadable, the human readable text may be read by an operator and the data manually entered into a system.

The process of manually entering such data is commonplace at grocery stores and the like where bar code readers occasionally fail to successfully read the bar code on a product. Although manually entering bar code data is slower than scanning bar coded merchandise, it is not terribly inconvenient or inefficient in grocery stores and the like where an operator is positioned at each bar code scanner and manually moves the bar coded merchandise over the scanner.

Small package delivery companies image and decode bar codes as packages travel along conveyor belts through terminal facilities. The tracking number, which is decoded from the bar code data, is used by automatic sorting equipment to sort the package and to track its movement through the package delivery company's package handling system. When used in this setting, bar codes are read and decoded very quickly and, in most cases, there are no operators positioned at each imaging station. In these circumstances, there is no convenient method for an operator to read the human readable text and manually enter the tracking number into the tracking computer system.

In some prior art systems, failure to decode a bar code is followed by an attempt to perform optical character recognition (OCR) on the entire string of human readable characters associated with the bar code. Although this approach provides an alternative to manual entry of the bar code data, the likelihood that the entire string of human readable text will be decoded correctly decreases as the length of the character string increases. For example, if an OCR algorithm has a 90% probability of recognizing a given character, the probability that the algorithm will correctly decode a string of 10 human readable characters is 0.9 to the 10th power, which equals approximately 35%.

Therefore, there is a need in the art for a more reliable system for using OCR techniques to assist in decoding damaged bar codes.

SUMMARY OF THE INVENTION

The present invention satisfies the above-described need by providing a system and method for performing OCR assisted bar code decoding. The invention employs OCR techniques to supplement conventional bar code reading techniques when they are unable to successfully decode one or more characters in the bar code symbol. When conventional bar code reading techniques are unable to recognize a bar code character or have an insufficient "confidence factor," the invention locates the human readable text associated with the unsuccessfully decoded bar code symbol and maps the failed bar code character to one or more of the human readable characters. The corresponding human readable characters are decoded using OCR techniques and the resulting substitute bar code character is used to complete the bar code decoding process.

Generally described, the present invention provides a method for decoding an image of a label that includes a bar code symbol and adjacent human readable characters. The bar code symbol includes bar code characters corresponding to the human readable characters. The method includes locating the bar code symbol in the image and attempting to decode a bar code character. If a bar code character is not successfully decoded, the method identifies the human readable characters in the image. The unsuccessfully decoded bar code character is mapped to at least one of the human readable characters, which are converted into at least one text character. A substitute bar code character is created to correspond to the text character. The substitute bar code character is used to decode the bar code symbol.

In another aspect, the present invention provides a system for reading data from an object that includes a bar code symbol and human readable characters. The bar code symbol includes bar code characters that correspond to the human readable characters. The system includes an imaging system with a camera for capturing an image of the package. The captured image includes both the bar code symbol and the human readable characters. The system also includes a label decoding system for processing the image. The label decoding system locates the bar code symbol in the image and attempts to decode each character in the bar code symbol. If one of the bar code characters fails to be decoded, the label decoding system locates the human readable characters in the image and maps the failed bar code character to at least one of the human readable characters. These human readable characters are converted into text characters, which are converted into a substitute bar code character that is used to decode the bar code symbol.

In yet another aspect, the present invention provides a computer-readable medium on which is stored a computer program for decoding an image of a label. The label includes a bar code symbol and human readable characters adjacent thereto. The bar code symbol includes bar code characters corresponding to the human readable characters. When executed by a computer, the program locates the bar code symbol in the image and attempts to decode it. Upon determining that a bar code character has failed decoding, the program identifies the human readable characters in the image and maps the failed bar code character to at least one of the human readable characters, which are converted into at least one text character. The program creates a substitute bar code character that corresponds to the text character and uses the substitute bar code character to decode the bar code symbol. The program then validates the bar code symbol.

It is therefore an object of the present invention to employ optical character recognition (OCR) techniques as a supplement to identify individual bar code characters.

It is another object of the present invention to map bar code characters to their associated human readable characters.

It is another object of the present invention to provide techniques for locating human readable characters relative to an associated bar code symbol.

These and other objects, features, and advantages of the present invention may be more clearly understood and appreciated from a review of the following detailed description of the disclosed embodiments and by reference to the appended drawings and claims.

BRIEF DESCRIPTION OF THE DRAWINGS

FIG. 9 is a flow diagram of the method of locating the human readable text that is illustrated in FIG. 8.

DETAILED DESCRIPTION

Figure 1:
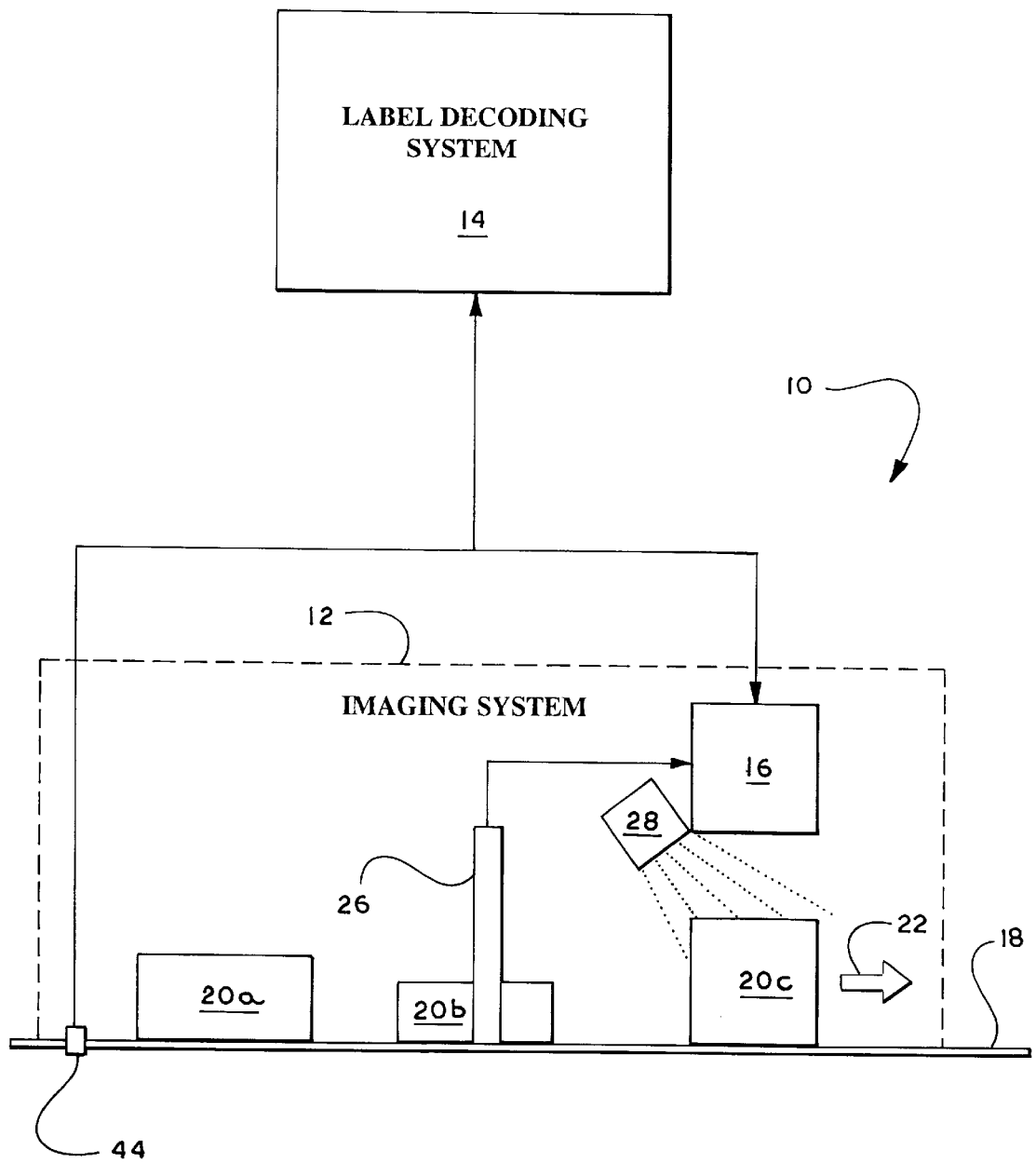
FIG. 1 is a block diagram of a system for capturing images of a package surface and decoding the data contained therein.

The present invention provides a novel system and method for performing OCR assisted bar code decoding. Generally described, the invention relies on OCR techniques to supplement conventional bar code reading techniques when they are unable to successfully decode one or more characters in the bar code symbol. When conventional bar code reading techniques fail to successfully decode a bar code character, the invention locates the human readable text associated with the bar code and maps the unsuccessfully decoded bar code character to one or more of the human readable characters. The corresponding human readable characters are decoded using OCR techniques and the resulting data is used to complete the bar code decoding process.

Before describing the present invention in additional detail, it is useful to discuss the terminology used in the specification. Portions of the detailed description that follows are represented largely in terms of processes and symbolic representations of operations performed by computer components, including a central processing unit (CPU) and memory storage devices for the CPU. These operations include the manipulation of data by the CPU and the maintenance of these data within data structures resident in one or more of the memory storage devices. The symbolic representations are the means used by those skilled in the art of computer programming and computer construction to most effectively convey teachings and discoveries to others skilled in the art.

For the purposes of this discussion, a process or portions thereof may be generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. In most cases, it will be apparent that these steps are performed by a computer without requiring input from an operator. The machines used for performing the operation of the present invention include general purpose digital computers or other similar computing devices.

In addition, it should be understood that no particular programming language is provided, and that the programs, processes, methods, etc. described herein are not limited to any particular computer or apparatus. Those skilled in the art will appreciate that there are many computers and operating systems which may be used in practicing the instant invention and therefore no detailed computer program could be provided which would be applicable to these many different systems. Each user of a particular computer or operating system will be aware of the program modules and tools that are most appropriate for that user's needs and purposes.

Referring now the drawings, in which like numerals represent like elements throughout the several figures, the present invention and an exemplary operating environment will be described.

AN EXEMPLARY OPERATING ENVIRONMENT

FIG. 1 illustrates an exemplary system 10 for capturing images of a package surface and decoding the information contained therein as packages travel on a conveyor belt. The system 10 includes an imaging system 12 and a label decoding system 14. Generally described, an exemplary imaging system 12 includes an over-the-belt (OTB) camera 16. The OTB camera 16 is mounted above a conveyor belt 18 that carries packages 20a–c in the direction of arrow 22. The OTB camera 16 captures an image of the top surface of the package, and provides the image to the label decoding system 14. The label decoding system 14 includes general purpose and high performance computers and data storage facilities, described in further detail below. The label decoding system 14 locates and decodes machine readable package identification data (e.g., a bar code) contained in the image. This package identification data is used to track the movement of the package through the delivery company's facilities and to control the sorting of the packages.

Figure 2:
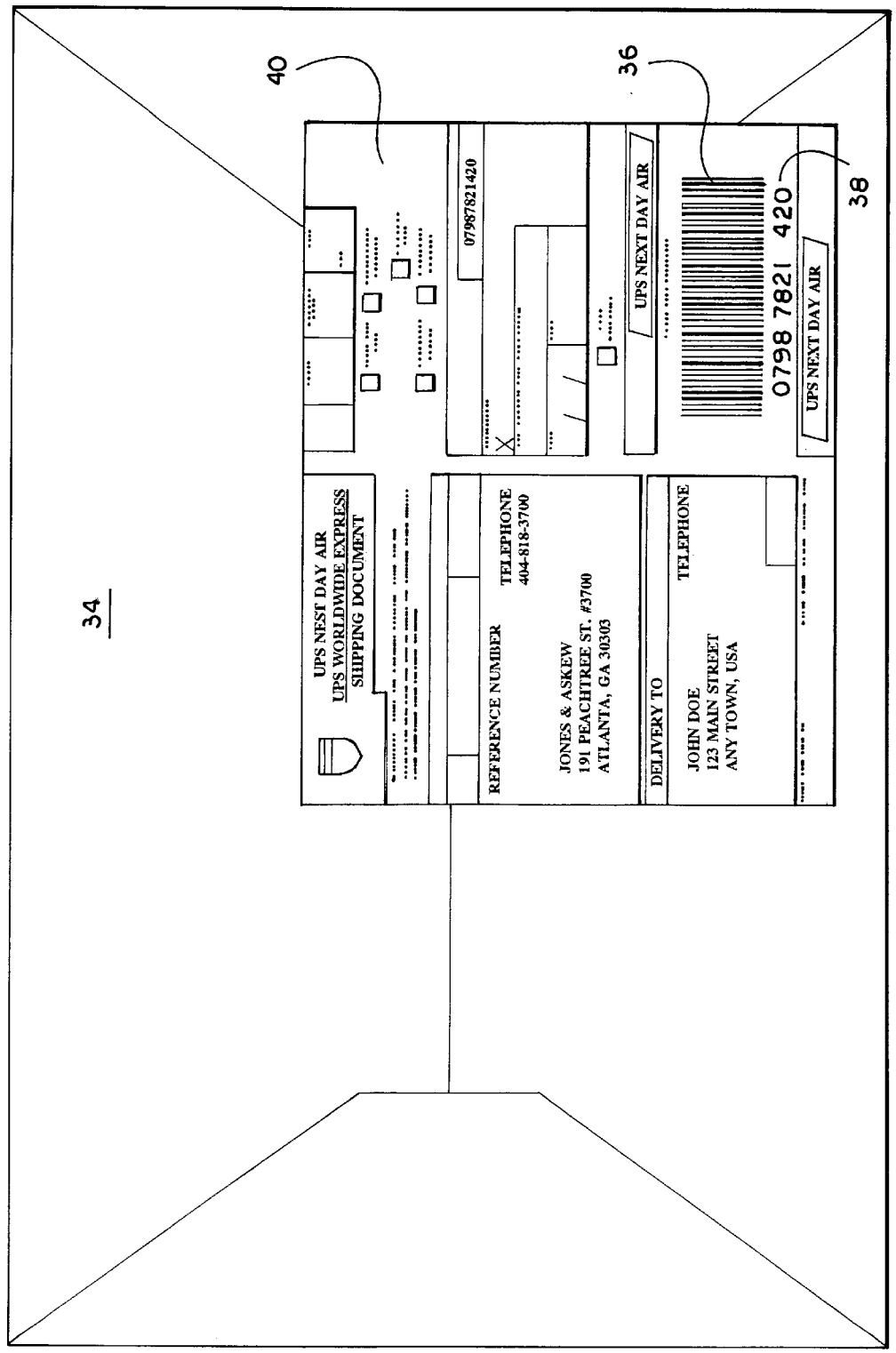
FIG. 2 is a diagram of a parcel including a shipping label that contains a bar code and corresponding alphanumeric characters.

FIG. 2 illustrates the top surface 34 of a package 20 that is processed by the system 10. The top surface 34 of each package 20 includes package tracking information in the form of a tracking number, which is represented by a machine readable bar code 36 and corresponding human readable text 38. In the example of FIG. 2, the bar code 36 and text 38 form a part of a shipping document 40 used by the assignee of the present invention. The shipping document 40 also includes the destination address, shipper's address, and information pertaining to billing and the type of service to be provided. The package tracking number represented by the bar code uniquely identifies the package and distinguishes it from the other packages in the delivery system.

Referring again to FIG. 1, the components and operation of the imaging system 12 and the label decoding system 14 will be described in additional detail. In addition to the OTB camera 16, the imaging system 12 includes a package height sensor 26, and an illumination source 28. As packages are transported by the conveyor belt 18 the packages 20a–c pass under the package height sensor 26. The package height sensor 26 is a commercially available light curtain, and is used to determined the height of the package before it passes beneath the OTB camera 16. The height information from the height sensor 26 is used by the camera's focusing system. This permits the OTB camera 16 to accurately focus on the top surface of the package 20c as it moves beneath the camera. The illumination source 28 illuminates the top surface of the package 20c as it passes beneath the OTB camera 16.

The conveyor belt system is used to transport packages through a terminal facility. In the system 10, the conveyor belt 18 is 24–40 inches wide and carries up to 5,000 packages per hour while moving at a rate of up to 500 feet per minute. The packages 20a–c vary in height and may be arbitrarily oriented on the conveyor belt 18. The conveyor belt 18 moves each package beneath the OTB camera 16 in single file, and with some amount of space between them. The packages are separated by a device known as a singulator. A suitable singulator is described in U.S. Pat. No. 5,372,238 to Bonnet, entitled "Method and Apparatus for Singularizing Objects."

The conveyor belt 18 includes a belt encoder 44 that is used to determine the speed and position the associated conveyor belt. Those skilled in the art will appreciate that the speed and position of the conveyor are needed in order to synchronize the package height information and the position of the package as it passes beneath the OTB camera 16. The belt encoder supplies a signal indicating the speed of the conveyor 18 to the OTB camera 16. The belt encoder 44 is selected to provide a pulse for each cycle of the OTB camera 16. Those skilled in the art will appreciate that the signal from the encoder allows the line images captured by the OTB camera 16 to be assembled by the label decoding system 14 into two-dimensional images with the correct aspect ratios. A more detailed description of the interaction between an OTB camera, conveyor belt, height information processor, and belt encoder is provided in U.S. Pat. No. 5,291,564 to Shah, entitled "System and Method for Acquiring an Optical Target," which is incorporated herein by reference.

The OTB camera 16 is preferably a monochrome, 4,096 pixel line-scan type camera. Each pixel measures approximately 10 mils by 10 mils. The CCD array is sufficiently wide to scan the entire width of the conveyor belt. The image of the package is captured one "slice" at a time as the package moves beneath the camera. The OTB camera 16 transmits an eight-bit gray-scale video signal corresponding to the captured image to the label decoding system 14. Illumination source 28 provides bright white light in order to illuminate the package as it is conveyed through the viewing area of the OTB camera 16, which captures an image of the surface of a package.

Suitable components for the imaging system 12, including camera systems, illumination sources, and the like, are described in U.S. Pat. Nos. 5,245,172 to Esslinger, entitled "Voice Coil Focusing System Having an Image Receptor Mounted on a Pivotally-Rotatable Frame," 5,308,960 to Smith et al., entitled "Combined Camera System," 5,327,171 to Smith et al., entitled "Camera System Optics," and 5,510,603 to Hess et al., entitled "Method and Apparatus for Detecting and Decoding Information Bearing Symbols Encoded Using Multiple Optical Codes," all of which are assigned to the assignee of the present invention and incorporated herein by reference.

The label decoding system 14 processes the data provided by the imaging system 12. The label decoding system 14 includes input/output devices for receiving data from the OTB camera 16. The label decoding system includes both general purpose computers and high performance computers. The high performance computers are used to run the OCR algorithms that are used to decode the human readable text 38. Suitable high performance computers include single board computers for imaging and signal processing, such as the "SUPER CARD" single board computer from CSPI. The general purpose computers, such as Motorola's MVME147 single board computer, are used to detect and decode the bar code that includes the package tracking information. The label decoding system includes storage devices such as memory, disk drives and tape drives. The label decoding system may also be connected to other computing equipment that is used for package tracking, sorting, billing, etc.

BAR CODE SYMBOLOGIES

Those skilled in the art will be familiar with the various bar code symbologies that are currently in use. Although the principles of the present invention are suitable for use with a variety of bar code symbologies, it will be described in conjunction with the Code 39 and Code 128 bar code symbologies, which are both used on package labels provided by the assignee of the present invention.

Figure 3:
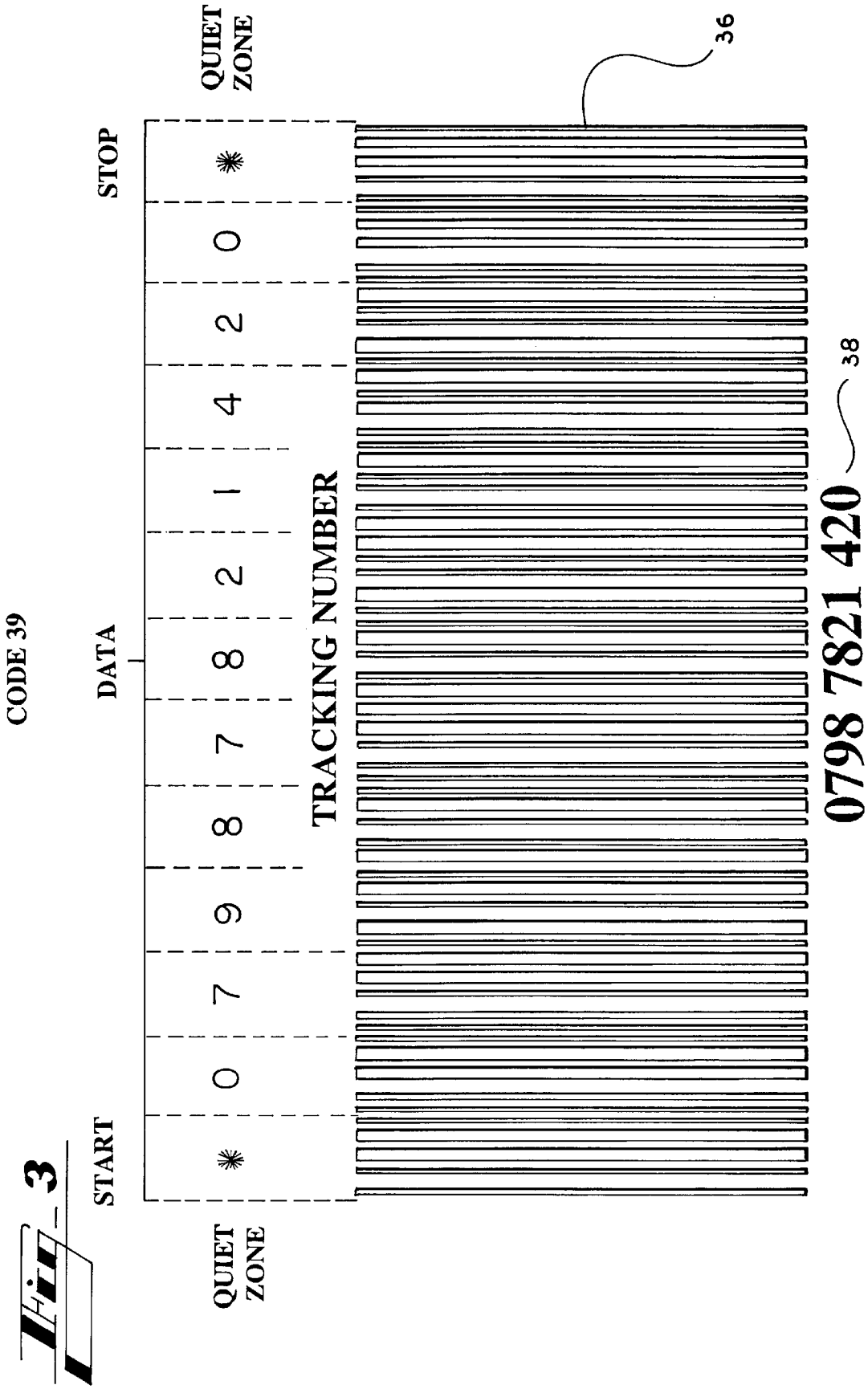
FIG. 3 is a diagram illustrating the features of the Code 39 bar code symbology.

FIG. 3 is a magnified view of the tracking number that appears on the shipping document shown in FIG. 2. FIG. 3 illustrates the bar code 36, which employs the Code 39 bar code symbology, and the corresponding human readable text 38.

Code 39 is an alphanumeric bar code that is designed to encode 26 upper case letters, 10 digits, and seven special characters. The symbol can be as long as necessary to store the encoded data. Each character in a Code 39 symbol is made up of five bars and four spaces. A space appears between each character. Each bar or space is either "wide" or "narrow." Three out of the nine elements in each character are always wide. A Code 39 symbol includes a leading quiet zone, a start character (*), the encoded data, a stop character (*), and a trailing quiet zone. The asterisk is only used as a start and stop character.

Although Code 39 does not normally include a check character, the Code 39 standard provides that one may be used if needed. To derive the check character, the value of each data character is summed up and divided by 43. The remainder is the value that is used as the check character.

Referring to FIG. 3, each Code 39 character includes five bars and four spaces. The bar code 36 includes 13 characters or code words, as indicated along the top of the bar code symbol. This symbol is used to encode the 11 characters that appear in the human readable text 38. The start and stop characters are referred to as non-printable characters and do not appear in the human readable text 38. Detailed information about Code 39 and the specific bar/space patterns for each character may be found in *The Bar Code Book: Reading, Printing, & Specification of Bar Code Symbols,* by Roger C. Palmer, published by Helmers Publishing, which is incorporated herein by reference.

Figure 4:
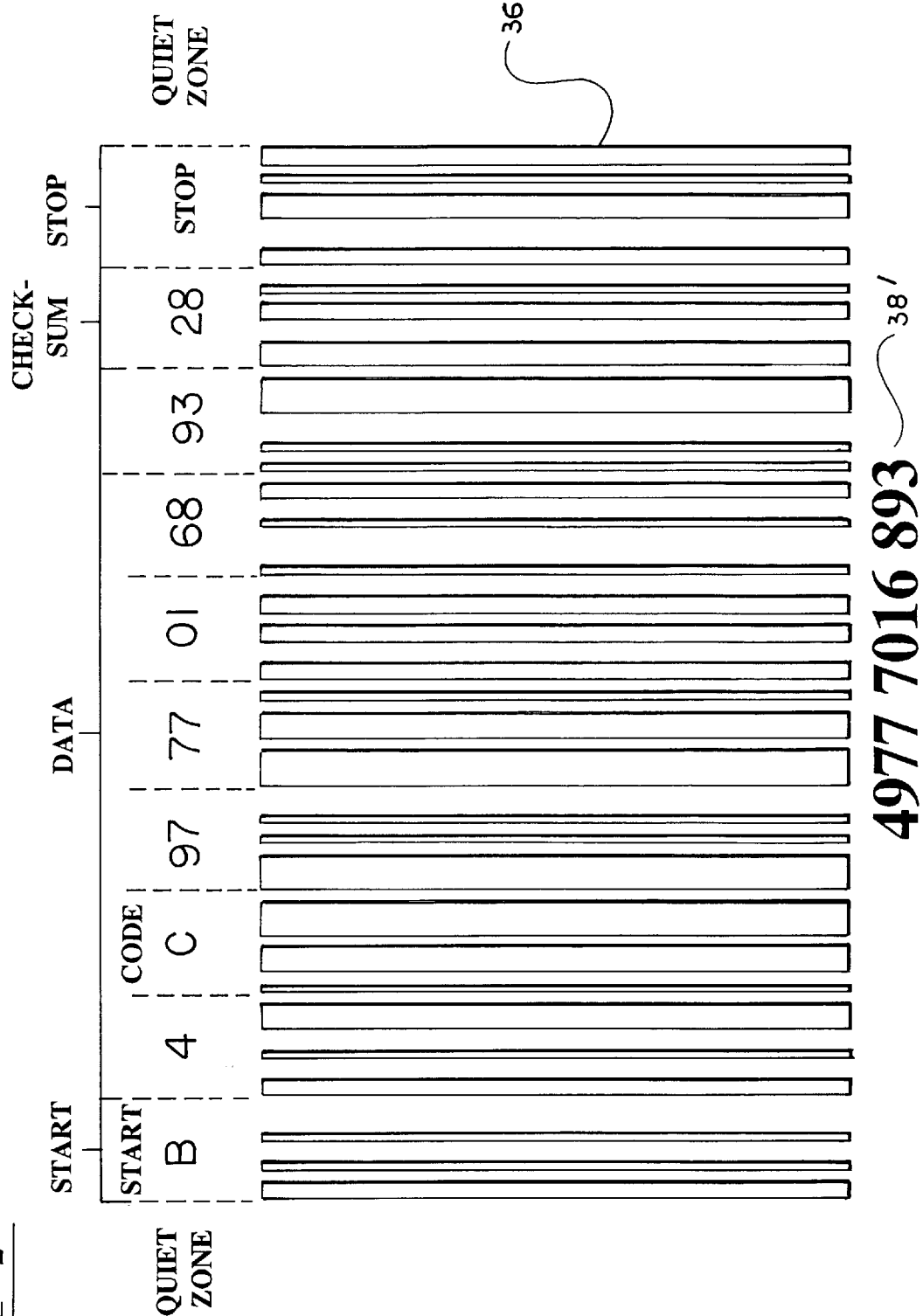
FIG. 4 is a diagram illustrating the features of the Code 128 bar code symbology.

FIG. 4 is a magnified view of the tracking number that appears on an alternate shipping document employed by the assignee of the present invention. FIG. 4 illustrates a bar code 36', which employs the Code 128 bar code symbology, and the corresponding human readable text 38'.

Code 128 is a high density alphanumeric bar code that is designed to encode all 128 ASCII characters. The symbol can be as long as necessary to store the encoded data. Each character in a Code 128 symbol is made up of three bars and three spaces. Each bar and space can be between one and four modules wide. Each character includes a total of 11 modules. The stop character is made up of 13 modules. A Code 128 symbol includes a leading quiet zone, a start character, the encoded data, a check character, the stop character, and a trailing quiet zone.

Code 128 includes 106 different 3 bar/3 space combinations. Each combination can be assigned one of three different character sets by using one of three different start characters. Start Code A allows encoding all the standard alphanumeric keyboard characters plus control characters and special characters. Start Code B includes all standard alphanumeric keyboard characters plus lower case alpha and special characters. Start Code C includes a set of 100 pairs of digits from 00 to 99 and can be used to double the density of encoding numeric-only data. Within a symbol, the data can shift between code sets by using a CODE character. The CODE character shifts to a different code set for all subsequent characters.

In Code 128, each character has a value ranging from 0 to 105. This value is used to calculate the check character for each symbol. The check character is a Modulo 103 checksum. To calculate the checksum, the start code value is summed with the product of each character position and the character value of the character at that position. This sum is divided by 103 and the remainder is used as the value of the check character.

Referring to FIG. 4, each Code 128 character, with the exception of the stop character, includes three bars and three spaces. The bar code 36' includes 10 characters or code words, as indicated along the top of the bar code symbol. Although the symbol includes only 10 characters, it is used to encode the 11 characters that appears in the human readable text 38'. Ten of the 11 numeric characters are encoded using five two-digit pairs, which are provided by Code 128's character set C. The remaining numeric character is encoded using character set B. The start character, code shift character (from code set B to code set C), checksum, and stop character are non-printable characters. Thus, the Code 128 symbol is used to efficiently represent 11 human readable characters 38' plus the overhead characters required by the Code 128 symbology. Detailed information about Code 128, and other bar code symbologies is provided in *The Bar Code Book: Reading, Printing, & Specification of Bar Code Symbols,* by Roger C. Palmer.

AN EXEMPLARY METHOD FOR OCR ASSISTED BAR CODE DECODING

As mentioned above, the present invention provides a system and method for performing OCR assisted bar code decoding. The method is useful for decoding bar codes that are degraded or partially obliterated, and in conjunction with relatively low resolution cameras where, for example, the pixel size may be on the order of 1.5 times the width of a narrow bar. Generally described, the invention employs OCR techniques to supplement conventional bar code reading techniques when those techniques fail to successfully decode one or more characters in the bar code symbol. When conventional bar code reading techniques fail (i.e., fail to recognize a bar code character or have an insufficient confidence factor), the invention locates the human readable text associated with the bar code and maps the failed bar code character to one or more of the human readable characters. The corresponding human readable character is decoded using OCR techniques and the resulting data is used to complete the bar code decoding process and provide the tracking number data.

Figure 5:
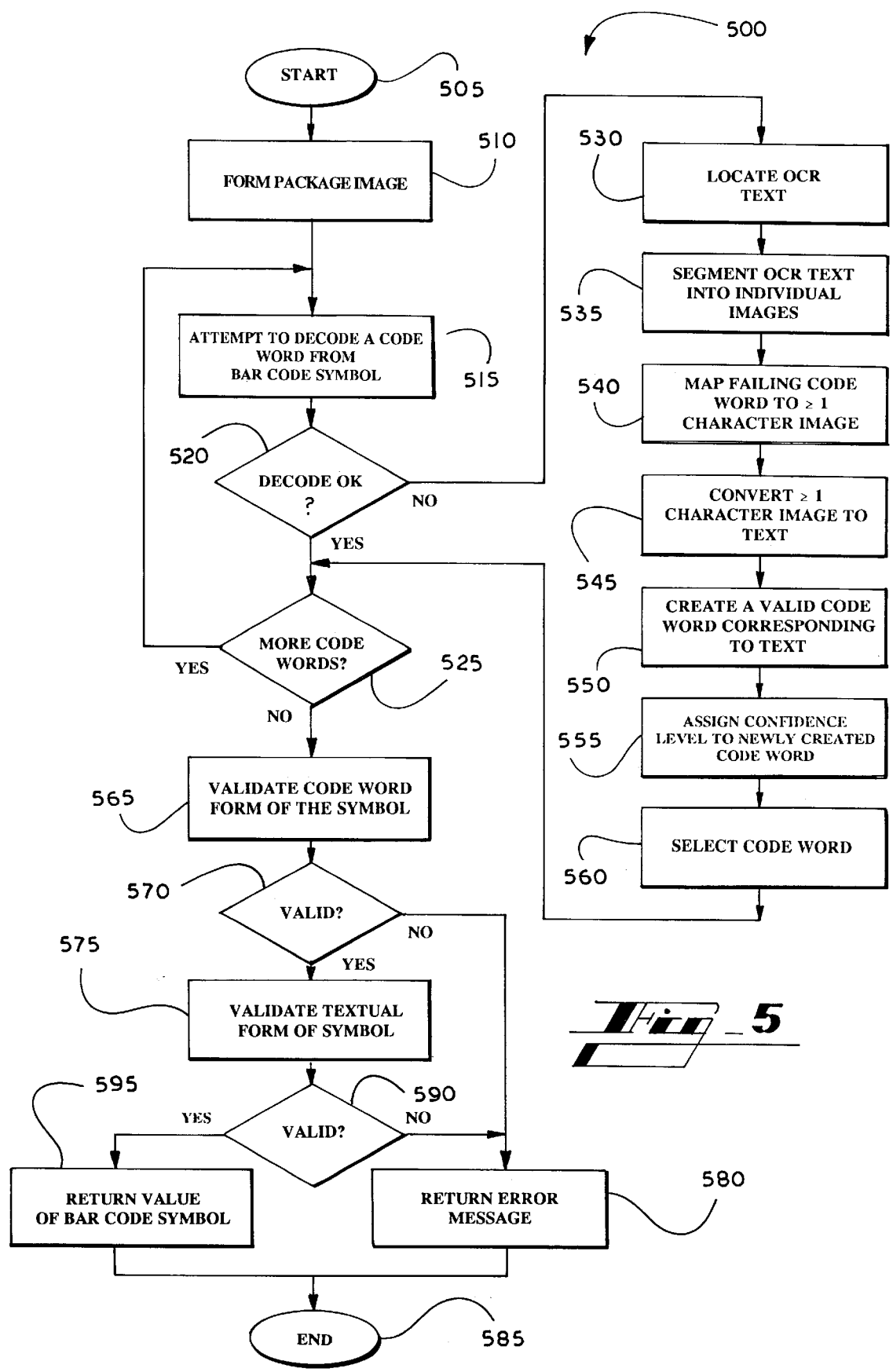
FIG. 5 is a flow diagram of the preferred method for performing OCR assisted bar code decoding.

FIG. 5 is a flow chart illustrating an exemplary method 500 for carrying out the present invention. The method 500 attempts to decode the package tracking number from a shipping label that includes a bar code and corresponding human readable text. The tracking number is provided as the output of the method. The method 500 is carried out by the label decoding system 14 that forms a part of the system 10 for reading package information (FIG. 1).

In general, a bar code symbol is decoded one code word at a time. If a code word is properly decoded using bar code decoding techniques, the method proceeds to the next code word. If a code word is not properly decoded using bar code techniques, the method resorts to OCR techniques in an effort to decode that particular code word. The method then attempts to decode the remaining code words using bar code reading techniques. Once all of the code words are decoded using bar code or OCR techniques, the method attempts to validate the bar code symbol as a whole and provides output data.

The method 500 begins at step 505 and proceeds to step 510. At step 510, the label decoding system forms an image of a package surface from the data provided by the OTB camera 16 that forms a part of the imaging system 12. The image data is provided one line at a time as a package moves beneath the OTB camera 16.

Once a package image is formed, the method proceeds to step 515 and attempts to locate the bar code symbol and decode the constituent code words using conventional bar code processing techniques. Those skilled in the art will appreciate that these techniques attempt to locate the bar code symbol in the captured image. Once the symbol is located, a suitable decoding algorithm is used to read the bar code symbol by decoding the constituent code words one at a time. The steps associated with the decoding algorithm typically include making several passes at decoding the symbol. If none of the passes is successful, the data may be merged in a process known as stitching, which attempts to extract valid bar code characters from each pass and combine them to reconstruct a full and valid set of bar code characters.

Those skilled in the art will appreciate that although bar codes can be printed with great precision, the images captured by cameras such as the OTB camera 16 include some amount of distortion and imprecision. This is attributable to the camera's resolution and a variety of other factors. As a result of this imprecision, the measurements between bar code characters or elements seldom, if ever, turn out to be precisely what is expected. Therefore, bar code processing techniques typically attempt to determine which expected pattern most closely matches the measurements in the image. The pattern matching process results in a "confidence factor" that describes how close the imaged character is to an expected pattern. The confidence factor must be above a predetermined threshold in order for the algorithm to determine that it has properly decoded the character. Thus, the decode algorithm will "fail" if it is unable to recognize a character or if it recognizes the character, but the "confidence factor" is too low.

As mentioned above, the techniques associated with step 515 are conventional bar code decoding techniques that will be familiar to those skilled in the art. Examples of various bar code processing techniques may be found in U.S. Pat. Nos. 5,276,315, entitled "Method and Apparatus for Processing Low Resolution Images of Degraded Bar Code Symbols," 5,329,015, entitled "Method and Apparatus for Determining the Width of Elements of Bar Code Symbols," 5,343,028, entitled "Method and Apparatus for Detecting and Decoding Bar Code Symbols Using Two-Dimensional Digital Pixel Images," 5,352,878 entitled "Method and Apparatus for Decoding Bar Code Symbols Using Independent Bar and Space Analysis," 5,384,451, entitled "Method and Apparatus for Decoding Bar Code Symbols Using Composite Signals," 5,404,003, entitled "Method and Apparatus for Decoding Bar Code Symbols Using Byte-Based Searching," 5,412,196, entitled "Method and Apparatus for Decoding Bar Code Images Using Multi-Ordered Feature Vectors," 5,412,197, entitled "Method and Apparatus for Decoding Bar Code Symbols Using Gradient Signals," 5,438,188, entitled "Method and Apparatus for Decoding Bar Code Images Using Information from Previous Scan Lines," and 5,524,068 entitled "Method and Apparatus for Finding Areas of Interest in Images," which are assigned to the assignee of the present invention and incorporated herein by reference.

At step 520 the label decoding system 14 determines whether the code word was properly decoded. If so, the method proceeds to step 525 and determines whether the bar code symbol includes additional code words that need to be decoded. If so, the method returns to step 515 and attempts to decode the next code word in the bar code symbol. If not, the method proceeds to step 565.

If, at step 520, the code word has not be properly decoded using bar code decoding techniques, the method 500 proceeds to step 530 and attempts to decode the code word using OCR techniques.

At step 530 the label decoding system locates the human readable text that is associated with the bar code and determines the boundaries of the data. In an exemplary system, this step operates on several assumptions regarding the position of the human readable text relative to the bar code symbol. First, it is assumed that the human readable text is located beneath the bar code symbol. Second, it is assumed that the human readable text is parallel to the longitudinal axis of the bar code symbol. Third, if the text is not located beneath the bar code, it is located directly above the center of the bar code and at the same angle as the bar code.

The present invention provides two methods that may be used to locate the human readable text, depending on the layout of the shipping labels used. The first method 530 is described in conjunction with the illustration of FIG. 6 and the flow diagram of FIG. 7. The second method 530' is described in conjunction with the illustration of FIG. 8 and the flow diagram of FIG. 9.

Figure 6:
FIG. 6 is an illustration of a portion of a shipping label illustrating a method for locating the OCR text adjacent to a bar code symbol.
Figure 7:
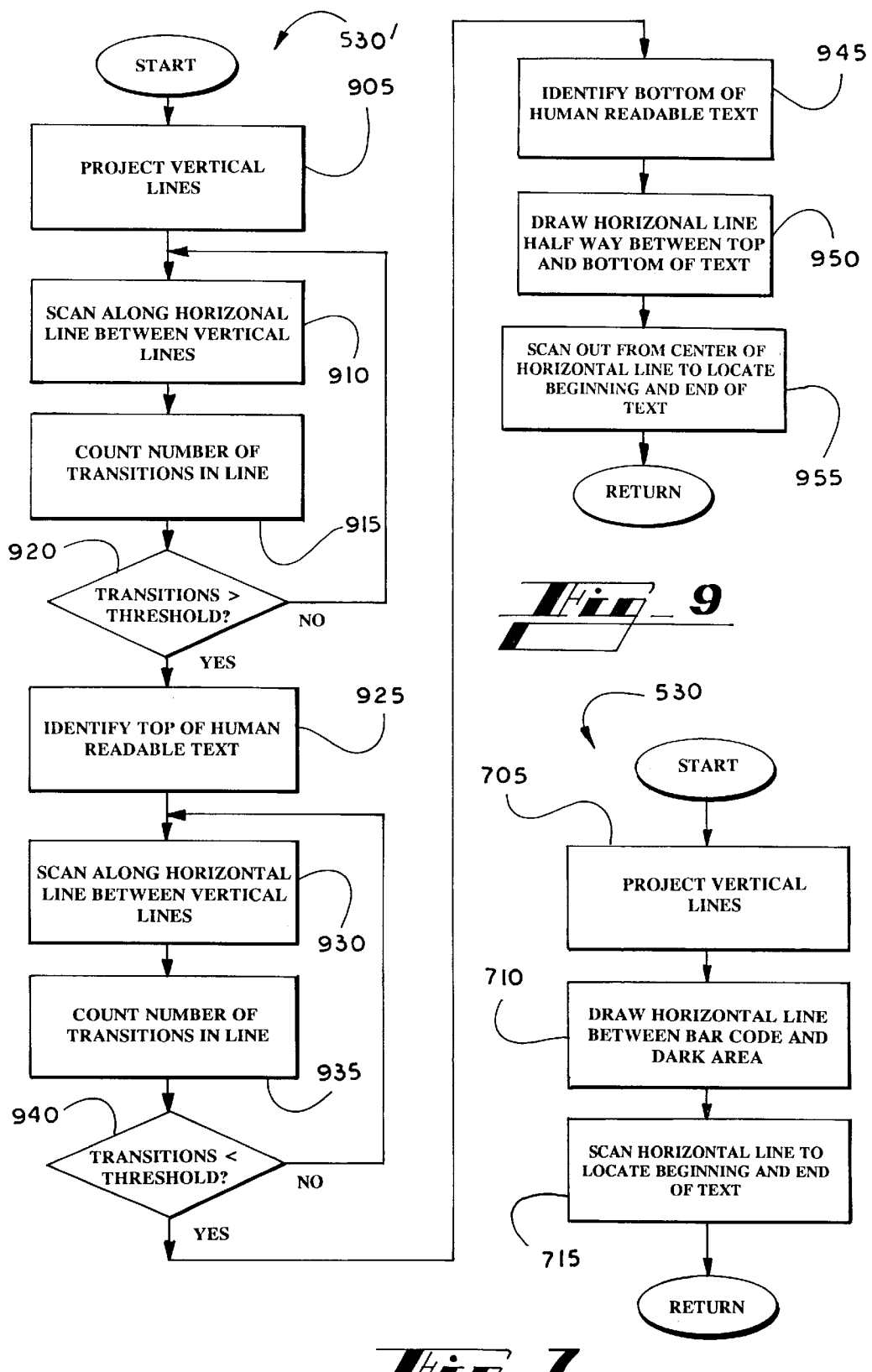
FIG. 7 is a flow diagram of the method of locating the human readable text that is illustrated in FIG. 6.

FIG. 6 depicts an image of the lower right corner of the shipping document 40 (FIG. 2), which includes a bar code symbol 36 and associated human readable text 38. The first method 530 is intended for use with labels that have a large, relatively dark area 600 located beneath the human readable text. Relying on the two assumptions and the assumption that the dark area 600 forms the bottom edge of a box that encloses the text 38, the method projects two imaginary lines 605 downward from the first and last bars of the bar code symbol 36 (FIG. 7, step 705). Because of the layout of the shipping document 40, the human readable text 38 is then enclosed in a box formed by the bottom edge of the bar code symbol 36, the top edge of dark area 600, and the two imaginary lines 605.

Once the box is formed, the method proceeds to draw an imaginary line 610 parallel to the bottom edge of the bar code symbol and located half way between the bottom of the bar code symbol and the dark area 600 (FIG. 7, step 710). Once the imaginary line 610 is drawn, the label decoding system identifies the left and right edges of the human readable text by detecting transitions between white and dark pixels (FIG. 7, step 715).

Figure 8:
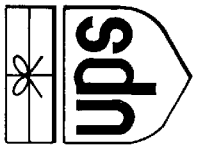
FIG. 8 is an illustration of a portion of a shipping label illustrating an alternate method for locating the OCR text adjacent to a bar code symbol.

An alternative method 530' for locating the text is described in conjunction with the illustration of FIG. 8 and the flow diagram of FIG. 9. FIG. 8 illustrates the top right portion of a second type of shipping document 40' used by the assignee of the present invention. This document includes a bar code 36' and associated human readable text 38', but does not include a dark area beneath the bar code. Therefore, this method relies on the first two assumptions discussed above, but does not utilize or require a large, dark area beneath the human readable text 38'.

The method 530' projects two imaginary lines 805 downward from the first and last bars of the bar code symbol 36' (FIG. 9, step 905). Because of the layout of the shipping document 40' the method assumes that the human readable text is located beneath the bar code symbol and within the area bounded by the two imaginary lines 805. The method proceeds to scan along a line 810 located just beneath the bar code symbol and parallel to the longitudinal axis of the bar code symbol. As each line is scanned, the method determines the number of transitions between black and white pixels in each line. If the number of transitions between black and white pixels exceeds a predetermined threshold, the top of the human readable text 38' has been located. If not, the method drops down and scans another line (FIG. 9, steps 910, 915, 920, and 925).

Once the top of the human readable text 38' is detected, the method continues to scan additional lines in order to locate the bottom of the human readable text. As each line is scanned, the method counts the number of transitions between black and white pixels in each line. If the number of transitions is below the predetermined threshold, the bottom of the human readable text has been located. If not, the method drops down and scans another line. (FIG. 9, steps 930, 935, 940, and 945).

This process may be described as constructing a histogram for each line scanned beneath the bar code symbol. When the number of transitions between black and white pixels exceeds a predetermined threshold, it indicates that the current line 815 marks the approximate top of the human readable text. The transition back to a small number of transitions indicates that the current line 820 marks the approximate bottom of the human readable text.

Once the top and bottom of the human readable text are located, the method draws a line 825 located half way between the top line 815 and bottom line 820 (FIG. 9, step 950). Starting from the center of the line 825 the method proceeds outward from the center and finds the left and right edges of the human readable text (FIG. 9, step 955). The result of this process may be described as identifying the corners of a box that encloses the human readable text 38'.

After the human readable text is located at step 530 using either of the methods 530, 530' described above, the method 500 proceeds to step 535 and segments the human readable text into individual images. In the method 500, this is accomplished by calling conventional OCR algorithms, which will be familiar to those skilled in the art. This step 535 results in a small box being drawn around each character in the human readable text and allows the method to determine how many characters are included in the human readable text. At this point, the human readable characters have not been decoded to form their ASCII code representations.

Those skilled in the art will appreciate that steps 530 and 535 are performed no more than once per bar code symbol. The OCR text is located and segmented only after a first code word fails to be properly decoded using bar code reading techniques. This information is stored and is available for use if and when additional code words fail to be decoded using bar code reading techniques. In the case of the second or subsequent failed code word, the method 500 would proceed from step 520 to step 540.

At step 540 the label decoding system 14 attempts to map the failed bar code character or code word to the corresponding character from the human readable text. Those skilled in the art will understand that the failed bar code character is identified by the bar code decoding algorithms applied at step 515. In an exemplary system, this is accomplished by calling a function and indicating which code word is unreadable. The function returns the position of the corresponding human readable character or characters.

Those skilled in the art will appreciate that the process of mapping a bar code character to its associated human readable character requires the consideration of several factors. As discussed earlier, some bar code characters are non-printable. These include start and stop characters, checksums and characters used to indicates character set shifts. In addition, one code word may be represented by more than one human readable character.

At step 540 the label decoding system knows several pieces of information about the bar code. First, the label decoding system should know the number of code words or characters in the bar code symbol. In most cases, this may be determined by the bar code decoding algorithms (step 515), even if one or more code words are unreadable, by measuring the width of the bar code symbol or counting the number of transitions between black and white. The label decoding system should also know the number of characters in the human readable text (step 535). Finally, the label decoding system will know which bar code symbology is being used. Once these three pieces of information are known, it will be possible to map the failed bar code character to the corresponding human readable character in most cases.

The mapping process proceeds on the basis of the information known to the label decoding system. For example, if the failed bar code is a Code 39 bar code, the number of bar code characters or code words equals two plus the number of human readable characters. The start and stop characters are non-printable characters and do not map to any human readable characters. Thus, the nth bar code character maps to the (n−1)th human readable character.

The situation is somewhat more complicated if the bar code is a Code 128 symbol. In this case, the non-printable characters includes the start and stop characters, a checksum characters, and, possibly, one or more code shift characters. By way of example, assume that in the example of FIG. 4, the bar code character "01" is unreadable. The label decoding system would recognize that the symbol is a Code 128 symbol, that there are 10 bar code characters, and that there are 11 human readable characters. Of the 10 bar code characters, at least three are non-printable characters. That leaves seven bar code characters to encode 11 human readable characters. Based on the characteristics of the Code 128 symbology, the label decoding system can determine that the bar code characters must include five characters in character set C, one character in character set A or B, and one character set shift character. In FIG. 4, the start character indicates that the symbol starts in character set B. Therefore, the first (and only) character in character set A must be followed by a character set shift character that shifts to character set C. Thus, the "01" character is the third character set C character, and would map to the sixth and seventh human readable characters.

Those skilled in the art will appreciate that the specific rules that are applied can vary depending on the particular bar code and subset of available characters used. Thus, these examples are intended to illustrates how the characteristics of a bar code symbology can be used to carry out the mapping process.

After the failed bar code character is mapped to one or more human readable characters, the method proceeds to step 545. At step 545 the label decoding system converts the appropriate human readable character or characters into their ASCII equivalent. In the preferred system, this is accomplished by providing a conventional OCR routine with the position of the character or characters that should be decoded. The OCR routine returns the ASCII value of the human readable characters.

At step 550 the ASCII value of the decoded human readable character is mapped or converted to the corresponding value in the proper bar code symbology, thereby creating a substitute bar code character or code word.

At step 555 the label decoding system assigns a confidence factor to the newly created substitute bar code character. Those skilled in the art will appreciate that OCR routines typically provide a confidence value or confidence factor that indicates the likelihood that the character was properly decoded from the human readable text. This confidence factor is used by the method 500 at step 560.

At step 560 the label decoding system selects the bar code characters for the failed character position. This selection is made from the characters provided by the bar code decoding routines (step 515) and the characters provided by the OCR routine (step 545). The label decoding system determines which character to use based on the same selection criteria used by the bar code decoding algorithms at step 515 to select from among multiple choices for a given character position. These criteria include threshold confidence factor values. Thus, the confidence factor associated with the OCR character must be on a scale that is compatible with the bar code decoding software. For example, the bar code and OCR decoding engines may be set up to provide confidence factors on a scale of 1–10, with each number representing a specified error rate.

Once the OCR character and compatible confidence factor are provided, the choice of a character is made from among the substitute bar code characters and the characters provided by the bar code decoding routines as if all choices had been provided by separate passes of the bar code decoding algorithm. Those skilled in the art will appreciate that the method attempts to ensure that the chosen character is sufficiently different than the other choices. This may be done, for example, by selecting a character only if the sum of its confidence factors is greater than twice the sum of the other characters.

Once the code word is decoded using OCR techniques, the method proceeds to step 525 and determines whether there are more code words to be decoded. If so, the method returns to step 515 and attempts to decode the next code word using bar code decoding techniques. If not, the method proceeds to step 565.

At step 565, the selected bar code character is validated by checksumming or other means. In an exemplary system, this step includes verifying the checksum character provided as part of Code 128 symbols. In an exemplary system, this step is not implemented in conjunction with bar code symbols that do not include checksum characters.

At step 570 the label decoding system determines whether the checksum indicates that the bar code symbol was properly decoded. If so, the method proceeds to step 575. If not, the method proceeds to step 580 and returns an "error" message. From step 580 the method terminates at step 585.

At step 575 the label decoding system validates the decoded tracking number by checksumming, template matching, or other means. In an exemplary system, the tracking numbers include check digits that may be checked to ensure that the tracking number was properly recorded. Thus, at step 575 the label decoding system will apply the appropriate checksum algorithm to ensure that the tracking number decoded from the bar code and human readable text appears to be a valid tracking number. This step provides further assurances that the tracking number was properly decoded from the bar code and human readable characters.

At step 590 the label decoding system determines whether the validation test of step 575 indicates that the tracking number decoded from the bar code symbol and human readable text is a valid tracking number. If so, the method proceeds to step 595, where it provides the tracking number as an output. If not, the method proceeds to step 580 and returns an "error" message. From step 595 or step 580 the method terminates at step 585.

From the foregoing description, it will be appreciated that the present invention provides an efficient method for using OCR techniques to assist in the decoding of bar code symbols. The present invention attempts to decode failed bar code symbols by applying OCR techniques to the human readable character or characters that correspond to the failed bar code character. Those skilled in the art will appreciate that this approach provides significant advantages over the prior art because it applies OCR techniques only to the failed bar code characters, thereby minimizing the reliance on the OCR techniques.

The foregoing method of the present invention may conveniently be implemented in a program module that is based upon the flow chart of FIG. 5. No particular programming language has been indicated for carrying out the various procedures described above because it is considered that the operations, steps and procedures described above and illustrated in the accompanying drawings are sufficiently disclosed to permit one of ordinary skill in the art to practice the instant invention. Moreover, there are many computers and operating systems which may be used in practicing the instant invention and therefore no detailed computer program could be provided which would be applicable to these many different systems. Each user of a particular computer will be aware of the language and tools which are most useful for that user's needs and purposes.

The present invention has been described in relation to particular embodiments which are intended in all respects to be illustrative rather than restrictive. For example, although the present invention has been described in conjunction with decoding Code 39 and Code 128 bar code symbols, those skilled in the art will understand that the principles of the present invention may be applied to other bar code symbologies. Furthermore, variations of the invention may be used in conjunction with documents, merchandise, or other articles on which two symbologies or encoding schemes are used to provide duplicate information.

Alternative embodiments will become apparent to those skilled in the art to which the present invention pertains without departing from its spirit and scope. Accordingly, the scope of the present invention is defined by the appended claims rather than the foregoing description.

What is claimed is:

1. A method for decoding an image of a label, the label including a bar code symbol and human readable characters adjacent thereto, the bar code symbol comprising bar code characters corresponding to the human readable characters, comprising the steps of:

locating the bar code symbol in the image;

attempting to decode a bar code character;

determining whether the bar code character has been successfully decoded;

in response to the bar code character not being successfully decoded, identifying the human readable characters in the image;

mapping the unsuccessfully decoded bar code character to at least one of the human readable characters;

converting the at least one human readable character into at least one text character; and creating a substitute bar code character corresponding to the at least one text character, whereby the substitute bar code character is used to decode the bar code symbol.

2. A method for decoding an image of a label as recited in claim 1, further comprising the step of validating the bar code symbol after all of the bar code characters have been decoded.

3. A method for decoding an image of a label as recited in claim 2, wherein validating the bar code symbol comprises verifying a checksum provided by the bar code symbol.

4. A method for decoding an image of a label as recited in claim 1, wherein identifying the human readable characters comprises the steps of:

identifying a region containing the human readable characters; and segmenting the region into individual images corresponding to each of the human readable characters.

5. A method for decoding an image of a label as recited in claim 4, wherein identifying the region comprises the steps of:

locating a dark area beneath the bar code symbol; and scanning a line midway between the bottom of the bar code symbol and the top of the dark area.

6. A method for decoding an image of a label as recited in claim 4, wherein identifying the region comprises the steps of:

scanning a plurality of lines beneath the bar code symbol, the scanned lines being parallel to the bar code symbol and separated from each other by a predetermined number of pixels;

determining the number of transitions between black and white pixels on each of the scanned lines; and locating the top and bottom of the human readable characters on the basis of the number of transitions between black and white pixels on each of the scanned lines.

7. A method for decoding an image of a label as recited in claim 1, wherein converting the at least one human readable character into at least one text character comprises applying optical character recognition techniques to the at least one human readable character.

8. A method for decoding an image of a label as recited in claim 1, further comprising the steps of:

providing a confidence factor associated with the substitute bar code character; and selecting the substitute bar code character on the basis of the confidence factor.

9. A system for reading a data from an object, the object including a bar code symbol and human readable characters, the bar code symbol comprising bar code characters corresponding to the human readable characters, comprising:

an imaging system including a camera for capturing an image of the package, the image including the bar code symbol and the human readable characters; and a label decoding system for processing the image;

the label decoding system being programmed to:
locate the bar code symbol in the image;
attempt to decode each character in the bar code symbol;
determine that one of the bar code characters failed decoding;
locate the human readable characters in the image;
map the failed bar code character to a human readable character;
convert the mapped human readable character into a text character;
create a substitute bar code character corresponding to the text character; and
use the substitute bar code character to decode the bar code symbol.

10. A system for reading a data from an object as recited in claim 9, wherein the label decoding system validates the substitute bar code symbol by verifying a checksum provided by the bar code symbol.

11. A system for reading a data from an object as recited in claim 9, wherein the label decoding system locates the human readable characters by performing the steps of:

identifying a region containing the human readable characters; and segmenting the region into individual images corresponding to each of the human readable characters.

12. A system for reading a data from an object as recited in claim 11, wherein the label decoding system identifies the region by performing the steps of:

locating a dark area beneath the bar code symbol; and scanning a line midway between the bottom of the bar code symbol and the top of the dark area.

13. A system for reading a data from an object as recited in claim 11, wherein the label decoding system identifies the region by performing the steps of:

scanning a plurality of lines beneath the bar code symbol, the scanned lines being parallel to the bar code symbol and separated from each other by a predetermined number of pixels;

determining the number of transitions between black and white pixels on each of the scanned lines; and locating the top and bottom of the human readable characters on the basis of the number of transitions on each of the scanned lines.

14. A system for reading a data from an object as recited in claim 9, wherein the label decoding system converts the at least one human readable character into at least one text character by applying optical character recognition techniques to the at least one human readable character.

15. A system for reading a data from an object as recited in claim 9, wherein the label decoding system is further programmed to:

provide a confidence factor associated with the substitute bar code character; and select the substitute bar code character on the basis of the confidence factor.

16. A computer-readable medium on which is stored a computer program for decoding an image of a label, the label including a bar code symbol and human readable characters adjacent thereto, the bar code symbol comprising bar code characters corresponding to the human readable characters, the computer program comprising instructions which, when executed by a computer, perform the steps of:

locating the bar code symbol in the image;

attempting to decode the bar code symbol by decoding each character in the bar code;

determining that a bar code character has failed decoding;

identifying the human readable characters in the image;

mapping the failed bar code character to at least one of the human readable characters;

converting the at least one human readable character into at least one text character;

creating a substitute bar code character corresponding to the at least one text character;

using the substitute bar code character to decode the bar code symbol; and validating the bar code symbol.

17. A computer-readable medium as recited in claim 16, wherein validating the bar code symbol comprises verifying a checksum provided by the bar code symbol.

18. A computer-readable medium as recited in claim 16, wherein identifying the human readable characters comprises the steps of:

identifying a region containing the human readable characters; and segmenting the region into individual images corresponding to each of the human readable characters.

19. A computer-readable medium as recited in claim 18, wherein identifying the region comprises the steps of:

locating a dark area beneath the bar code symbol; and scanning a line midway between the bottom of the bar code symbol and the top of the dark area.

20. A computer-readable medium as recited in claim 18, wherein identifying the region comprises the steps of:

scanning a plurality of lines beneath the bar code symbol, the scanned lines being parallel to the bar code symbol and separated from each other by a predetermined number of pixels;

determining the number of transitions between black and white pixels on each of the scanned lines; and locating the top and bottom of the human readable characters on the basis of the number of transitions on each of the scanned lines.

21. A computer-readable medium as recited in claim 16, wherein converting the at least one human readable character into at least one text character comprises applying optical character recognition techniques to the at least one human readable character.

22. A computer-readable medium as recited in claim 16, further comprising the steps of:

providing a confidence factor associated with the substitute bar code character; and selecting the substitute bar code character on the basis of the confidence factor.

* * * * *